United States Patent
Yaldo (10) Patent No.: US 11,613,276 B2
(45) Date of Patent: Mar. 28, 2023

(54) CONTROLLING A VEHICLE IN A PLANNED STOP-AND-GO SITUATION

(71) Applicant: Zenuity AB, Gothenburg (SE)

(72) Inventor: Valor Yaldo, Bloomfield, MI (US)

(73) Assignee: Zenuity AB, Gothenburg (SE)

( * ) Notice: Subject to any disclaimer, the term of this patent is extended or adjusted under 35 U.S.C. 154(b) by 181 days.

(21) Appl. No.: 16/997,602

(22) Filed: Aug. 19, 2020

(65) Prior Publication Data
US 2022/0055662 A1 Feb. 24, 2022

(51) Int. Cl.
*B60W 60/00* (2020.01)
*B60W 30/18* (2012.01)
*G05D 1/02* (2020.01)

(52) U.S. Cl.
CPC .. *B60W 60/0025* (2020.02); *B60W 30/18018* (2013.01); *G05D 1/0278* (2013.01)

(58) Field of Classification Search
CPC ........ B60W 60/0025; B60W 30/18018; G05D 1/0278
See application file for complete search history.

(56) References Cited

U.S. PATENT DOCUMENTS

| | | | |
|---|---|---|---|
| 9,633,560 B1* | 4/2017 | Gao | G08G 1/07 |
| 2014/0244157 A1* | 8/2014 | Tan | G08G 1/167 |
| | | | 701/423 |
| 2018/0218218 A1* | 8/2018 | Madan | G06F 3/0346 |
| 2019/0383626 A1* | 12/2019 | Fowe | G08G 1/0133 |
| 2021/0034847 A1* | 2/2021 | Lacaze | G06V 40/10 |

* cited by examiner

*Primary Examiner* — Calvin Cheung
(74) *Attorney, Agent, or Firm* — Christopher & Weisberg, P. A.

(57) ABSTRACT

The present disclosure relates to a pull up controlling system of a vehicle for controlling the vehicle in a planned stop-and-go situation. The pull up controlling system determines a position of the vehicle and identifies a stop-and-go destination within a predeterminable distance from the vehicle position. The stop-and-go destination includes an interaction interface. The pull up controlling system provides a user input request relating to whether to discard or acknowledge the stop-and-go destination. The pull up controlling system receives intention data indicative of confirmation to acknowledge the stop-and-go destination. The pull up controlling system further derives preference data indicative of an openable section of the vehicle. The pull up controlling system maneuvers the vehicle to pull up at the stop-and-go destination, with the openable section aligned with the interaction interface.

20 Claims, 3 Drawing Sheets

Fig. 3

# CONTROLLING A VEHICLE IN A PLANNED STOP-AND-GO SITUATION

FIELD

The present disclosure relates to controlling a vehicle in a planned stop-and-go situation.

BACKGROUND

An increasing number of modern vehicles have advanced driver-assistance systems, ADAS, to increase vehicle safety and more generally road safety. ADAS—which for instance may be represented by lane departure avoidance, adaptive cruise control, ACC, collision avoidance system, forward collision warning, etc.—are electronic systems that may aid a vehicle driver while driving. To function as intended, ADAS may rely on inputs from multiple data sources, such as e.g. LIDARs, radars, ultrasonics, cameras, automotive imaging, image processing, computer vision, and/or in-car networking.

Moreover, in a not too distant future, autonomous or automated driving systems, AD systems, will to greater extent find their way into modern vehicles. An AD system is a complex combination of various components that can be defined as systems where perception, decision making, and operation of the vehicle are performed by electronics and machinery instead of a human driver, and as introduction of automation into road traffic. This includes handling of the vehicle, destination, as well as awareness of surroundings. While the automated system has control over the vehicle, it allows the human operator to leave all responsibilities to the system. An AD system commonly combines a variety of sensors to perceive the vehicle's surroundings, such as e.g. radar, LIDAR, sonar, camera, navigation and/or positioning system e.g. GNSS such as GPS, odometer and/or inertial measurement units, upon which advanced control systems may interpret sensory information to identify appropriate navigation paths, as well as obstacles and/or relevant signage.

Notwithstanding this advanced modern technology—available today and/or within a near future—planned vehicle stop-and-go situations, such as pulling up at a mailbox or drive thru or the like, are commonly approached in an old-fashioned manner.

SUMMARY

It is therefore an object of embodiments herein to provide an approach for in an improved and/or alternative manner controlling a vehicle in a planned stop-and-go situation.

The object above may be achieved by the subject-matter disclosed herein. Embodiments are set forth in the appended claims, in the following description and in the drawings.

The disclosed subject-matter relates to a method performed by a pull up controlling system of a vehicle for controlling the vehicle in a planned stop-and-go situation. The pull up controlling system determines with support from a positioning system, a position of the vehicle. The pull up controlling system further identifies with support from a digital map, a stop-and-go destination within a predeterminable distance from the vehicle position, wherein the stop-and-go destination comprises an interaction interface. Moreover, the pull up controlling system requests with support from a user interface, user input relating to whether to discard or acknowledge the stop-and-go destination. Furthermore, the pull up controlling system receives with support from the user interface, intention data indicative of confirmation to acknowledge the stop-and-go destination. The pull up controlling system further derives preference data indicative of an openable section of the vehicle. Moreover, the pull up controlling system maneuvers, with support from an advanced driver-assistance system, ADAS, or autonomous driving, AD, system of the vehicle, the vehicle to pull up at the stop-and-go destination, with the openable section aligned with the interaction interface.

The disclosed subject-matter further relates to a pull up controlling system of a vehicle for controlling the vehicle in a planned stop-and-go situation. The pull up controlling system comprises a position determining unit for—and/or adapted for—determining with support from a positioning system, a position of the vehicle. The pull up controlling system further comprises a destination identifying unit for—and/or adapted for—identifying with support from a digital map, a stop-and-go destination within a predeterminable distance from the vehicle position, wherein the stop-and-go destination comprises an interaction interface. Moreover, the pull up controlling system comprises an input requesting unit for—and/or adapted for—providing with support from a user interface, a user input request relating to whether to discard or acknowledge the stop-and-go destination. Furthermore, the pull up controlling system comprises an intention receiving unit for receiving with support from the user interface, intention data indicative of confirmation to acknowledge the stop-and-go destination. The pull up controlling system further comprises a preferences deriving unit for—and/or adapted for—deriving preference data indicative of an openable section of the vehicle. Moreover, the pull up controlling system comprises a maneuvering unit for—and/or adapted for—maneuvering with support from an advanced driver-assistance system, ADAS, or autonomous driving, AD, system of the vehicle, the vehicle to pull up at the stop-and-go destination, with the openable section aligned with the interaction interface.

Furthermore, the disclosed subject-matter relates to a vehicle comprising a pull up controlling system as described herein.

Moreover, the disclosed subject-matter relates to a computer program product comprising a computer program containing computer program code means arranged to cause a computer or a processor to execute the steps of a pull up controlling system described herein, stored on a computer-readable medium or a carrier wave.

The disclosed subject-matter further relates to a non-volatile computer readable storage medium having stored thereon said computer program product Thereby, there is introduced an approach according to which an occupant of a vehicle may be assisted in pulling up at a desired stop-and-go destination —such as a mailbox and/or drive thru restaurant or the like—in a convenient manner. That is, since there is determined with support from a positioning system a position of the vehicle, there is established a geographical position and/or localization of the vehicle. Moreover, that is, since there is identified with support from a digital map, a stop-and-go destination within a predeterminable distance from the vehicle position, wherein the stop-and-go destination comprises an interaction interface, a place and/or facility suitable, of interest and/or applicable for a temporary vehicle pull up, having an interaction interface such as e.g. a mailbox or mailbox opening and/or drive thru delivery/payment window, may be found in vicinity of the vehicle. Furthermore, that is, since there is provided with support from a user interface, a user input request relating to whether to discard or acknowledge the stop-and-go destination, the pull up controlling system prompts for user input regarding if the identified stop-and-go destination should be ignored or approved. Moreover, that is, since there is received with support from the user interface—for instance provided from an occupant of the vehicle—intention data indicative of confirmation to acknowledge the stop-and-go destination, there may be established that said stop-and-go destination should be acknowledged, which equates to that there is an interest in making a detour thereto. Furthermore, that is, since there is derived preference data indicative of an openable section of the vehicle, preferences in view of an openable section of the vehicle —for instance a vehicle window—are obtained. Moreover, that is, since the pull up controlling system maneuvers, with support from an ADAS or AD system of the vehicle, the vehicle to pull up at the stop-and-go destination with the openable section aligned with the interaction interface, since the stop-and-go destination—as a result of that intention data has been received—is deemed to be approved and/or selected for a stop-and-go visit, the vehicle is with assistance from the ADAS or AD system maneuvered to the identified stop-and-go destination and pulled up at an interaction interface thereof with the—as indicated by the preference data—preferred openable section oriented towards and/or facing the interaction interface. Accordingly, the vehicle is automatically pulled up at the stop-and-go destination—e.g. represented by a mailbox and/or drive thru restaurant —in a manner positioning the preferred openable section of the vehicle 2—e.g. represented by a vehicle window—aligned with the interaction interface—e.g. represented by a mailbox or mailbox opening and/or drive thru delivery/payment window—for instance at a predeterminable distance therefrom. Thus, with such a pull up position of the preferred openable section relative the interaction interface, there is provided a convenient placement of the vehicle in view of potential vehicle occupant interaction with and/or via the interaction interface For that reason, an approach is provided for in an improved and/or alternative manner controlling a vehicle in a planned stop-and-go situation.

The technical features and corresponding advantages of the above mentioned method will be discussed in further detail in the following.

BRIEF DESCRIPTION OF THE DRAWINGS

The various aspects of the non-limiting embodiments, including particular features and advantages, will be readily understood from the following detailed description and the accompanying drawings, in which.

DETAILED DESCRIPTION

Non-limiting embodiments of the present disclosure will now be described more fully hereinafter with reference to the accompanying drawings, in which currently preferred embodiments of the disclosure are shown. This disclosure may, however, be embodied in many different forms and should not be construed as limited to the embodiments set forth herein. Like reference characters refer to like elements throughout. Dashed lines of some boxes in the figures indicate that these units or actions are optional and not mandatory.

In the following, according to embodiments herein which relate to controlling a vehicle in a planned stop-and-go situation, there will be disclosed an approach according to which an occupant of a vehicle may be assisted in pulling up at a desired stop-and-go destination—such as a mailbox and/or drive thru restaurant or the like—in a convenient manner.

Figure 1:
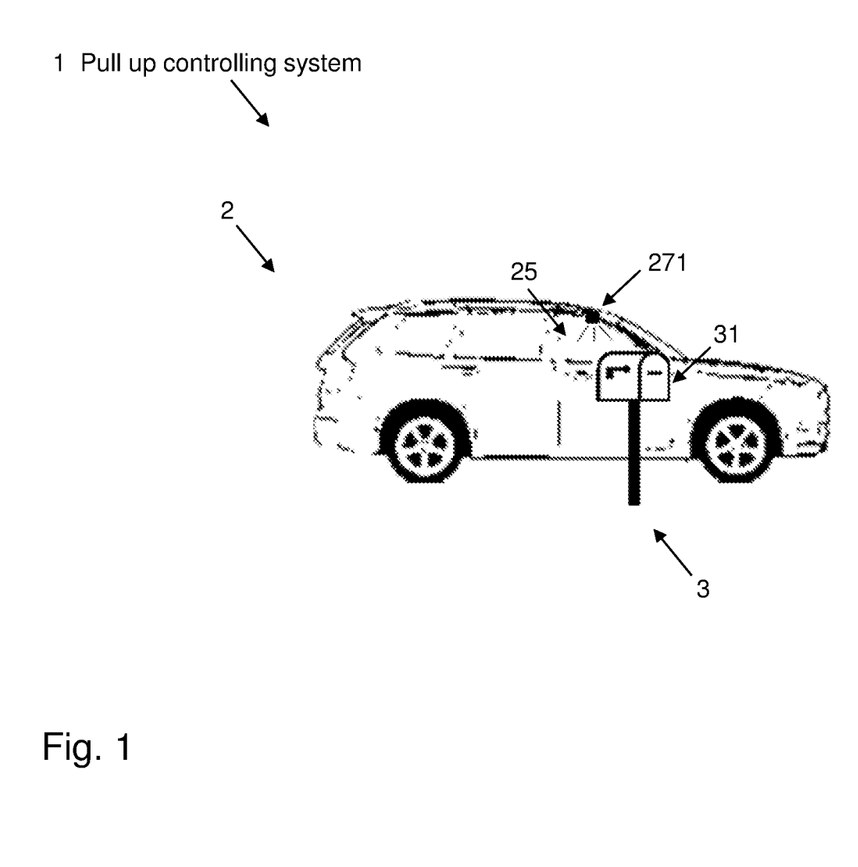
FIG. 1 illustrates a schematic view of an exemplifying pull up controlling system of a vehicle according to embodiments of the disclosure.
Figure 2:
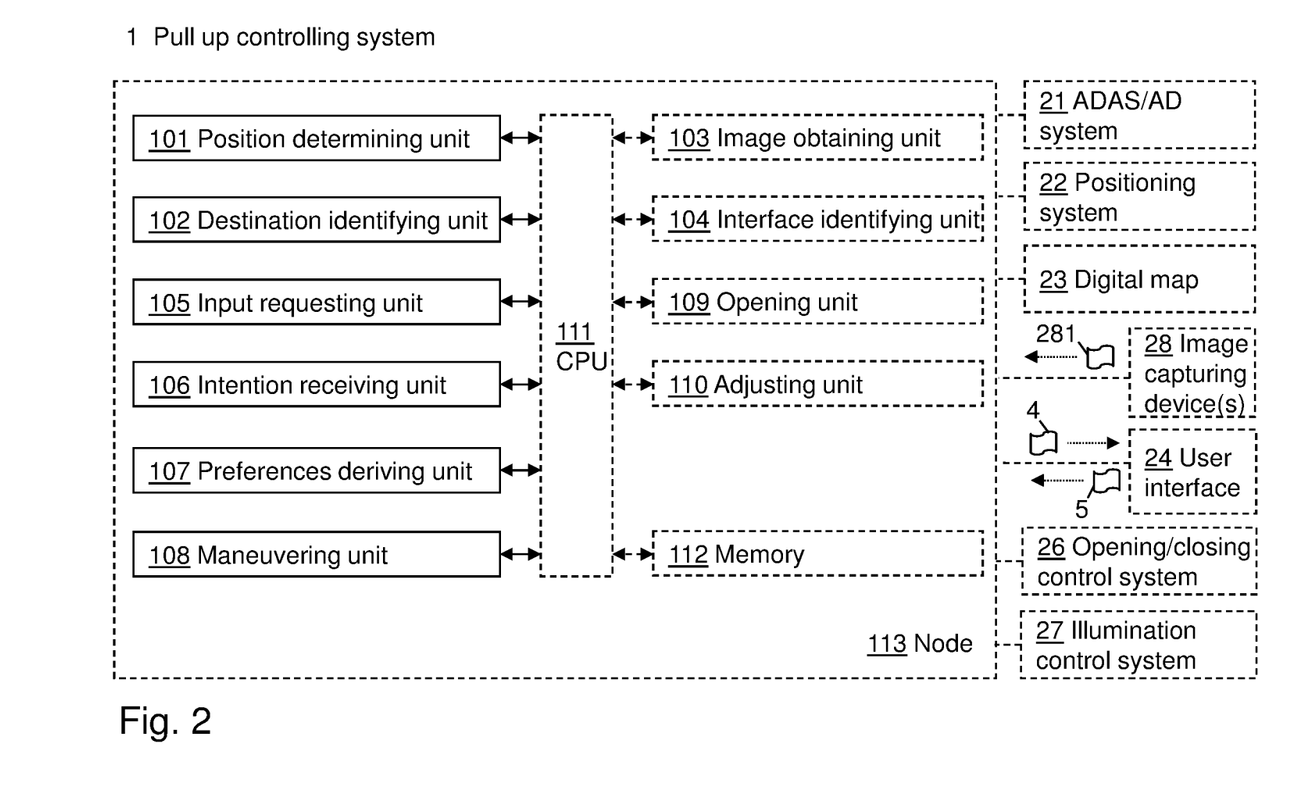
FIG. 2 is a schematic block diagram illustrating an exemplifying pull up controlling system according to embodiments of the disclosure.

Referring now to the figures, there is depicted in FIG. 1 a schematic view of an exemplifying pull up controlling system 1 of a vehicle 2 according to embodiments of the disclosure, and in FIG. 2 a schematic block diagram illustrating an exemplifying pull up controlling system 1 according to embodiments of the disclosure. The pull up controlling system 1 is adapted for controlling the vehicle 2 in a planned stop-and-go situation.

The exemplifying vehicle 2 may be represented by any arbitrary—e.g. known—manned or unmanned vehicle, for instance an engine-propelled or electrically-powered vehicle such as a car, truck, lorry, van, bus and/or tractor. Moreover, the term "vehicle" may refer to "autonomous and/or at least partly autonomous vehicle", "driverless and/or at least partly driverless vehicle", and/or "self-driving and/or at least partly self-driving vehicle". The vehicle 2 thus comprises, and/or is adapted to support an ADAS and/or AD system 21, i.e. an advanced driver-assistance system and/or an automated driving system. Such an ADAS and/or AD system 21 may refer to any arbitrary ADAS and/or AD system, e.g. known in the art and/or yet to be developed. The vehicle 2 and/or the ADAS or AD system 21 may comprise, be provided with and/or have on-board an optional perception system (not shown) and/or similar system and/or functionality adapted to estimate surroundings of the vehicle 2, and subsequently adapted to estimate world views of the surroundings e.g. with support from a—e.g. commonly known—digital map such as a high definition, HD, map. Such an exemplifying perception system or similar system may refer to any commonly known system and/or functionality, e.g. comprised in one or more electronic control modules, ECUs, and/or nodes of the vehicle 2 and/or the ADAS or AD system 21, adapted and/or configured to interpret sensory information—relevant for driving of the vehicle 2—to identify e.g. obstacles, vehicle lanes, relevant signage, appropriate navigation paths etc. The exemplifying perception system or similar system—which may be adapted to support e.g. sensor fusion, tracking, localization etc.—may thus be adapted to rely on sensory information. Such exemplifying sensory information may for instance be derived from one or more—e.g. commonly known—sensors comprised in and/or provided on-board the vehicle 2 adapted to sense and/or perceive the vehicle's 2 whereabouts and/or surroundings, for instance represented by one or a combination of one or more of a positioning system, odometer, inertial measurement units, radar, lidar, ultrasonics and/or one or more image capturing devices such as cameras.

The phrase "pull up controlling system" may refer to "pull up assisting system", "pull up system", "stop-and-go controlling system" and/or merely "control system", whereas "of" a vehicle may refer to "comprised in" a vehicle and/or "on-board" a vehicle. "For" controlling a vehicle, on the other hand, may refer to "adapted for" controlling a vehicle, whereas "for controlling a vehicle" may refer to "for assisting a vehicle occupant", and according to an example further to "for maneuvering —and potentially controlling cockpit functionality of —a vehicle". Moreover, the phrase "in a planned stop-and-go situation" may refer to "during a planned stop-and-go situation", "in a predetermined, intentional, desired, acknowledged and/or approved stop-and-go situation", "in a planned temporary pull up and/or stand still situation" and/or "in a planned stop-and-go situation of said vehicle".

The pull up controlling system 1 is—e.g. by means of a position determining unit 101—adapted and/or configured for determining with support from a positioning system 22, a position of the vehicle 2. Thereby, there is established a geographical position and/or localization of the vehicle 2

Determining the position of the vehicle 2 with support from the positioning system 22 may be accomplished in any arbitrary—e.g. known—manner, potentially with support from dead reckoning computations and/or similar approaches. Similarly, the positioning system 22 may be represented by any arbitrary—e.g. known—sensors and/or functionality adapted to sense and/or determine whereabouts and/or geographical position, e.g. via GNSS such as GPS. Moreover, the positioning system 22 may be at least partly comprised in—and/or provided on-board—the vehicle 2, for instance in association with the ADAS and/or AD system 21.

The phrase "determining [ . . . ] a position" may refer to "deriving [ . . . ] a position", whereas "position" may refer to "geographical position". The phrase "with support from a positioning system", on the other hand, may refer to "with input from a positioning system", "from a positioning system", "with support at least from a positioning system" and/or "with support from a positioning system comprised in and/or on-board said vehicle", whereas "a position of said vehicle" may refer to "a vehicle position".

The pull up controlling system 1 is—e.g. by means of a destination identifying unit 102—adapted and/or configured for identifying with support from a digital map 23, a stop-and-go destination 3 within a predeterminable distance from the vehicle position, wherein the stop-and-go destination 3 comprises an interaction interface 31. Thereby, by mapping the vehicle position to a digital map 23, a place and/or facility suitable, of interest and/or applicable for a temporary vehicle pull up such as e.g. a mailbox—as illustrated in exemplifying FIG. 1—and/or drive thru restaurant, having an interaction interface 31 such as e.g. a mailbox or mailbox opening—as illustrated in exemplifying FIG. 1—and/or drive thru delivery/payment window, may be found in vicinity of the vehicle 2.

Identifying—based on the vehicle position—a stop-and-go destination 3 within a predeterminable distance from the vehicle 2, may be accomplished in any arbitrary—e.g. known—manner in view of the digital map 23. For instance, the stop-and-go destination 3—e.g. a drive thru restaurant—may be recognized, tagged and/or marked as such in the digital map 23 e.g. as default, or alternatively, the stop-and-go destination 3—e.g. a mailbox and/or the coordinated thereof—may have been pre-selected and/or pre-stored as such by a user e.g. a potential occupant of the vehicle 2, e.g. having access to and/or owning said mailbox. The digital map 23 may be represented by any arbitrary—e.g. known—digital map, such as a high definition, HD, map and/or an equivalent and/or successor thereof. Moreover, the digital map 23 may be at least partly comprised in—and/or provided on-board—the vehicle 2, for instance in association with the ADAS and/or AD system 21. The predeterminable distance from the vehicle position, on the other hand, may be represented by any arbitrary feasible distance, for instance ranging from a few meters up to tens of kilometers. According to an example, the predeterminable distance may be restricted by a visibility range of one or more sensors on-board the vehicle 2

The stop-and-go destination 3 may be represented by any arbitrary facility and/or location applicable and/or feasible—and/or determined or deemed applicable and/or feasible—for a temporary vehicle pull up, providing an interaction interface 31 via and/or through which a user—e.g. an occupant of the vehicle 2—may interact. The stop-and-go destination 3 may accordingly be represented by e.g. a mailbox, a drive thru facility such as e.g. a drive thru restaurant and/or store, and/or a parking ticket and/or toll payment station or the like. Similarly, the interaction interface 31 may be represented by e.g. an exchange, handover, delivery and/or transaction interface e.g. an opening—such as e.g. an openable window, door or slot e.g. manually operated—and/or a machine such as a cash collector and/or payment card reader The phrase "identifying [ . . . ] a stop-and-go destination" may refer to "deriving and/or determining [ . . . ] a stop-and-go destination", "identifying [ . . . ] a stop-and-go facility, target, place, place of interest and/or location", "identifying [ . . . ] a temporary pull up destination" and/or "identifying [ . . . ] a destination, place, location, element and/or coordinates associated with, tagged and/or marked as relevant for temporary vehicle pull up". The phrase "identifying with support from a digital map", on the other hand, may refer to "identifying with input from a digital map", "identifying from a digital map" and/or "identifying with support from a digital map comprised in and/or on-board said vehicle", whereas "within a predeterminable distance from said vehicle position" according to an example may refer to "within a presumed, determined and/or derived sensor range of said vehicle". Moreover, "interaction interface" may refer to "exchange, handover delivery and/or transaction interface" and/or "interaction interface providing and/or supporting interaction with a user such as an occupant of a vehicle through an openable section of the vehicle".

The pull up controlling system 1 is—e.g. by means of an input requesting unit 105—adapted and/or configured for providing with support from a user interface 24, a user input request 4 relating to whether to discard or acknowledge the stop-and-go destination 3. Thereby, the pull up controlling system 1 prompts for user input regarding if the identified stop-and-go destination 3 should be ignored or approved.

Providing the user input request 4 may be accomplished in any arbitrary—e.g. known—manner with assistance from the user interface 24, and similarly, the user interface 24 may be represented by any arbitrary feasible—e.g. known—interface adapted to present the user input request 4, e.g. to a potential occupant of the vehicle 2. For instance, the user input request 4 may be provided via a user interface 24 as a message and/or information indicative of the identified stop-and-go destination 4, e.g. in a visible and/or audible manner. Correspondingly, the user interface 24 may for instance be represented by a user interface 24 comprising a display—such as a touch sensitive display—and/or one or more loudspeakers.

The phrase "providing [ . . . ] a user input request" may refer to "communicating [ . . . ] a user input request", "requesting [ . . . ] user input" and/or "prompting [ . . . ] for user input", whereas "user input request" may refer to "user confirmation request", "user intention request" and/or "user input demand". Moreover, according to an example, the phrase "providing [ . . . ] a user input request relating to whether to discard or acknowledge said stop-and-go destination" may refer to "providing [ . . . ] a user input request signal, message and/or data requesting input—and/or indicating a request for input—regarding whether to discard or acknowledge said stop-and-go destination". The phrase "user input request relating to whether to discard or acknowledge said stop-and-go destination", on the other hand, may refer to "user input request indicative of, posing and/or comprising a question whether to discard or acknowledge said stop-and-go destination", whereas "discard" may refer to "ignore and/or reject" and "acknowledge" may refer to "approve and/or accept". Moreover, the phrase "user interface" may refer to "human machine interface", and according to an example further to "user interface of and/or comprised in said vehicle". Furthermore, the phrase "providing with support from a user interface" may refer to "providing with assistance from a user interface" and/or "providing to and/or via a user interface"

The pull up controlling system 1 is—e.g. by means of an intention receiving unit 106—adapted and/or configured for receiving with support from the user interface 24, intention data 5 indicative of confirmation to acknowledge the stop-and-go destination 3. Thereby, should data 5 relating to acceptance of the identified stop-and-go destination 3 be received via the user interface 24—for instance provided from an occupant of the vehicle 2—then there may be established that said stop-and-go destination 3—in exemplifying FIG. 1 represented by a mailbox—should be acknowledged, which equates to that there is an interest in making a detour thereto 3.

Receiving the intention data 5 confirming that said stop-and-go destination 3 should be acknowledged may be accomplished in any arbitrary—e.g. known—manner with assistance from the user interface 24. For instance, the intention data 5 may be received via a touch display of said user interface 24, and/or audibly via a microphone thereof, as provided by a user e.g. an occupant of the vehicle 2. According to an example, non-receiving of—and/or failure to receive—intention data 5 within a predeterminable time period, may equate to that the stop-and-go destination 3 should be deemed to be discarded.

The phrase "receiving [. . . ] intention data" may refer to "deriving [. . . ] intention data", and according to an example further to "receiving within a predeterminable time period [. . . ] intention data", where such an optional predeterminable time period for instance may range from a few seconds up to several minutes. The phrase "intention data", on the other hand, may refer to "user input data" and/or "an intention message and/or signal". Moreover, "intention data indicative of confirmation to acknowledge said stop-and-go destination" may refer to "intention data reflecting confirmation to acknowledge said stop-and-go destination" and/or "intention data confirming acknowledgment of said stop-and-go destination". Furthermore, the phrase "receiving with support from said user interface" may refer to "receiving with assistance from said user interface" and/or "receiving from and/or via said user interface"

The pull up controlling system 1 is—e.g. by means of a preferences deriving unit 107—adapted and/or configured for deriving preference data indicative of an openable section 25 of the vehicle 2. Thereby, preferences in view of an openable section 25 of the vehicle 2 are obtained.

The openable section 25 of the vehicle 2 may be represented by any arbitrary openable portion and/or area of the vehicle 2, such as a door, trunk, boot, hood and/or lid thereof. Optionally, however, the openable section 25 may comprise—and/or be represented by—an openable window, as illustrated in exemplifying FIG. 1, for instance positioned near—e.g. at and/or next to—a driver seat or passenger seat of the vehicle 2. The preference data indicative of the openable section 25, may be pre-stored, e.g. on-board the vehicle 2 and/or in association with a user profile such as of an occupant of the vehicle 2. Moreover, the preference data—which for instance may indicate a default openable section 25 such as a driver seat window—may further be adjustable. For instance, the preference data may be adjusted and/or set by a user such as an occupant of the vehicle 2, which preference data then for instance may be comprised in the intention data 5 or provided in association therewith, and/or provided via the user interface 24. Alternatively, the preference data may be adjusted based on a learned behavior of the vehicle 2 and/or an occupant thereof.

The phrase "deriving preference data" may refer to "obtaining, fetching and/or receiving preference data", whereas "preference data" may refer to "preferences and/or a preference". Moreover, the phrase "preference data indicative of an openable section of said vehicle" may refer to "preference data indicating and/or pointing out an openable section of said vehicle" and/or "preference data indicative of a preferred and/or selected openable section of said vehicle".

The pull up controlling system 1 is—e.g. by means of a maneuvering unit 108—adapted and/or configured for maneuvering, with support from an ADAS or AD system 21 of the vehicle 2, the vehicle 2 to pull up at the stop-and-go destination 3, with the openable section 25 aligned with the interaction interface 31. Thereby, since the stop-and-go destination 3—as a result of that intention data has been received—is deemed to be approved and/or selected for a stop-and-go visit, the vehicle 2 is with assistance from the ADAS or AD system 21 maneuvered to the identified stop-and-go destination 3 and pulled up at an interaction interface 31 thereof with the—as indicated by the preference data—preferred openable section 25 oriented towards and/or facing the interaction interface 31. Accordingly, the vehicle 2 is automatically pulled up at the stop-and-go destination 3—in FIG. 1 represented by a mailbox—in a manner positioning the preferred openable section 25 of the vehicle 2—in FIG. 1 represented by a vehicle window—aligned with the interaction interface 31—in FIG. 1 represented by a mailbox or mailbox opening—for instance at a predeterminable distance therefrom. Thus, with such a pull up position of the preferred openable section 25 relative the interaction interface 31, there is provided a convenient placement of the vehicle 2 in view of potential vehicle occupant interaction with and/or via said interaction interface 31

Maneuvering the vehicle 2 to pull up at the stop-and-go destination 3 with the openable section 25 aligned with the interaction interface 31 may be accomplished in any arbitrary feasible manner with assistance from the ADAS or AD system 21. For instance, the vehicle 2 may be maneuvered utilizing the digital map 23, the positioning system 22, the optional perception system or similar system and/or on-board sensors such as discussed above. The openable section 25 may be aligned with the interaction interface 31 for instance at a predeterminable distance therefrom, which distance for instance may range from a few centimeters up to over a meter. Moreover, such a distance—which for instance may be set to a default value—may further be adjustable and/or set by a user such as an occupant of the vehicle 2, which distance then for instance may be comprised in the intention data 5 or provided in association therewith, and/or provided via the user interface 24. Alternatively, said distance may be adjusted based on a learned behavior of the vehicle 2 and/or an occupant thereof.

Once potential interaction has taken place and/or the vehicle 2 is due to drive away from the interaction interface 31, an occupant e.g. a driver of the vehicle 2 may take control thereof, e.g. by inactivation of a parked and/or standstill mode of the vehicle 2.

The phrase "maneuvering [ . . . ] said vehicle" may refer to "controlling [ . . . ] said vehicle" and/or "at least partly maneuvering [ . . . ] said vehicle", and according to an example further to "maneuvering based on said preference data [ . . . ] said vehicle". Moreover, "maneuvering with support from an ADAS or AD system" may refer to "maneuvering utilizing an ADAS or AD system" and/or "maneuvering with assistance from an ADAS or AD system". The phrase "pull up at said stop-and-go destination", on the other hand, may refer to "stop and/or standstill at said stop-and-go destination", and according to an example further to "pull up and bring and/or set said vehicle to an at least partly parked and/or standstill mode at said stop-and-go destination". Moreover, the phrase "with said openable section aligned with said interaction interface" may refer to "with said openable section essentially aligned with said interaction interface" and/or "with said openable section oriented towards, facing and/or pulled up alongside said interaction interface", and according to an example further to "with said openable section aligned with said interaction interface at a predeterminable distance therefrom" and/or merely "with said openable section—and/or a predeterminable portion thereof—positioned at a predeterminable distance from said interaction interface and/or a predeterminable portion thereof".

Optionally, the pull up controlling system 1 may—e.g. by means of an optional opening unit 109—be adapted and/or configured for opening at least partly, with support from an opening/closing control system 26, the openable section 25. Thereby, the preferred openable section 25—in FIG. 1 represented by a vehicle window—may be opened e.g. pulled down without involvement from a vehicle occupant. Accordingly, not only is the vehicle 2 automatically pulled up at the stop-and-go destination 3 with the preferred openable section 25 of the vehicle 2 aligned with the interaction interface 31 of the stop-and-go destination 3, additionally may said openable section 25 then be automatically opened, which may provide even more convenience for an occupant of said vehicle 2.

Opening of the openable section 25 may be initiated at any arbitrary feasible time point. For instance, opening of the openable section 25 may be initiated upon the vehicle 2 having pulled up at the stop-and-go destination 3, and for instance further have been brought and/or set to an at least partly parked and/or standstill mode by the pull up controlling system 1. Alternatively, opening of the openable section 25 may be initiated at any arbitrary time point prior to the vehicle 2 being brought to a stop at the stop-and-go destination 3, such as less than a second prior thereto up to minutes prior thereto. The opening/closing control system, on the other hand, may refer to any arbitrary—e.g. known—control system and/or functionality adapted to control opening and/or closing of the openable section 25, e.g. comprising one or more commonly known actuators.

Once potential interaction has taken place and/or the vehicle 2 is due to drive away from the interaction interface 31, an occupant e.g. a driver of the vehicle 2 may as previously discussed take control thereof, e.g. by inactivation of a parked and/or standstill mode of the vehicle 2, whereby the openable section 25 may be automatically closed—and/or re-set to a previous position—by the pull up controlling system 1.

The phrase "opening at least partly" may refer to "opening fully or to a predeterminable extent", whereas "opening [ . . . ] with support from an opening/closing control system" may refer to "opening [ . . . ] with assistance from an opening/closing control system" and/or "opening [ . . . ] utilizing an opening/closing control system". According to an example, the phrase "opening [ . . . ] said openable section" may refer to "opening [ . . . ] said openable section when said vehicle has been brought to a stop and/or standstill at said stop-and-go destination" and/or "opening [ . . . ] said openable section when said vehicle has been brought and/or set to an at least partly parked and/or standstill mode at said stop-and-go destination".

Optionally, the pull up controlling system 1 may—e.g. by means of an optional adjusting unit 110—be adapted and/or configured for adjusting at least a first vehicle setting and/or position of at least a first cockpit function and/or element of the vehicle 2 to support vehicle occupant interaction with the interaction interface 31, for instance—as illustrated in exemplifying FIGS. 1-2—interior illumination 271 of the vehicle 2 with support from an illumination control system 27. Thereby, action(s) may be taken in terms of adjustment of one or more cockpit functions and/or cockpit elements of the vehicle 2—such as increasing interior illumination 271—to facilitate interaction by a potential occupant of said vehicle 2 with and/or via the interaction interface 31 of the stop-and-go destination 3.

The at least first cockpit function and/or cockpit element of the vehicle 2 may be represented by and/or comprise any arbitrary HW- and/or SW-related functionality of the vehicle 2 applicable for the vehicle's 2 cockpit, whereas adjusting at least a first vehicle setting and/or position thereof may be represented by and/or comprise any arbitrary feasible adjustment deemed to support—e.g. facilitate—potential vehicle occupant interaction with the interaction interface 31. For instance, adjusting at least a first vehicle setting and/or position of at least a first cockpit function and/or element of the vehicle 2 may be represented by and/or comprise adjusting one or more vehicle settings and/or positions of one or more or a combination of interior illumination 271 e.g. increasing and/or modifying interior illumination 271, vehicle seat e.g. seat position adjustment, seat belt e.g. loosening and/or unbuckling thereof, steering wheel e.g. retraction thereof, audio volume e.g. decreasing the volume, etc. Adjusting the one or more vehicle settings and/or positions of the one or more cockpit functions and/or elements may be initiated at any arbitrary feasible time point. For instance, adjusting the one or more vehicle settings and/or positions of the one or more cockpit functions and/or elements may be initiated upon the vehicle 2 having pulled up at the stop-and-go destination 3, and for instance further have been brought and/or set t to an at least partly parked and/or standstill mode by the pull up controlling system 1. Alternatively, adjusting the one or more vehicle settings and/or positions of the one or more cockpit functions and/or elements may be initiated at any arbitrary time point prior to the vehicle 2 being brought to a stop at the stop-and-go destination 3, such as less than a second prior thereto up to minutes prior thereto. The optional illumination control system 27, on the other hand, may refer to any arbitrary—e.g. known—control system and/or functionality adapted to control interior illumination 271 of the vehicle 2.

Once potential interaction has taken place and/or the vehicle 2 is due to drive away from the interaction interface 31, an occupant e.g. a driver of the vehicle 2 may as previously discussed take control thereof, e.g. by inactivation of a parked and/or standstill mode of the vehicle 2, whereby the at least first vehicle setting and/or position of the at least first cockpit function and/or element of the vehicle 2 automatically may be re-set to its previous setting and/or position by the pull up controlling system 1.

"Adjusting at least a first vehicle setting and/or position" may refer to "setting at least a first vehicle setting and/or position", whereas the phrase "adjusting at least a first vehicle setting and/or position of at least a first cockpit function and/or element of said vehicle" according to an example may refer to "adjusting at least a first vehicle setting and/or position of at least a first cockpit function and/or element of said vehicle when said vehicle has been brought and/or set to an at least partly parked and/or standstill mode at said stop-and-go destination". Moreover, the phrase "to support vehicle occupant interaction" may according to an example refer to "to support facilitated vehicle occupant interaction", whereas the phrase "for instance interior illumination" according to an example may refer to "for instance increasing interior illumination".

Optionally, the pull up controlling system 1 may—e.g. by means of an optional image obtaining unit 103—be adapted and/or configured for obtaining image data 281 with support from one or more image capturing devices 28 adapted to capture surroundings of the vehicle 2. The pull up controlling system 1 is then—e.g. by means of an optional interface identifying unit 104—further adapted and/or configured for identifying the interaction interface 31 based on the image data 281. Thereby, there is derived data 281 from one or more images of vehicle surroundings captured by said image capturing device(s) 28, which image data 281 may be processed and/or analyzed for finding and/or locating the interaction interface 31 of the stop-and-go destination 3. Accordingly, based on said image data 281, presumably comprising at least a portion of the interaction interface 31, the interaction interface 31—for instance represented by a mailbox or mailbox opening as illustrated in FIG. 1 and/or drive thru delivery/payment window—may be recognized.

The image data 281 may be obtained in any arbitrary—e.g. known—manner with support from the at least first image capturing device 28, for instance derived from one or more images captured by said image capturing device(s) 28, for instance continuously and/or intermittently. Similarly, the one or more image capturing devices 28—which may be comprised in and/or be provided on-board the vehicle 2 and distributed in any arbitrary feasible manner—may be represented by any arbitrary sensors, functionality and/or systems adapted to capture surrounding of the vehicle 2, for instance one or more cameras. According to an example, the image capturing device(s) 28 may be provided in association with the ADAS or AD system 21. Moreover, the image data 281 may be represented by any arbitrary feasible data derived from the image capturing device(s) 28, and further be of any arbitrary feasible size and/or format. Furthermore, the image data 281 may cover any arbitrary portion of vehicle surroundings, in any arbitrary direction of the vehicle 2, for instance in at a least a forward direction thereof 2. Notably, however, in order to be able to identify the interaction interface 31, at least a portion of the interaction interface 31 needs to be comprised in the image data 281, and the interaction interface 31 accordingly be within range of at least one of the one or more image capturing devices 28. Moreover, the interaction interface 31 may be identified in any feasible manner from said image data 281. For instance, the interaction interface 31 may be identified from object classification of the interaction interface 31 in the image data 281, e.g. with support from a—e.g. known—machine learning approach, and/or by feeding the image data 281 through a—e.g. known—neural network, such as e.g. a convolutional neural network, trained to identify and classify interaction interfaces.

The phrase "obtaining image data" may refer to "deriving and/or capturing image data", whereas "image data" may refer to "image data of at least a portion of surroundings of said vehicle" and/or "one or more images". Moreover, according to an example, "obtaining image data with support from" may refer to "obtaining image data from one or more images derived with support from". The phrase "adapted to capture surroundings of said vehicle", on the other hand, may refer to "adapted to capture at least a portion of surroundings of said vehicle". Moreover, the phrase "identifying said interaction interface" may refer to "recognizing, finding and/or locating said interaction interface", whereas "based on said image data" may refer to "based on—and/or by—processing and/or analyzing said image data". According to an example, the phrase "identifying said interaction interface based on said image data" may refer to" identifying said interaction interface based on object classification of said interaction interface in said image data" and/or "identifying said interaction interface based on feeding said image data through a neural network, such as a convolutional neural network, trained to identify and classify interaction interfaces".

Optionally, the pull-up at the stop-and-go destination 3 may be based on a pre-recorded manually operated vehicle pull up at the stop-and-go destination 3. Thereby, the vehicle 2 may be maneuvered to pull up at the stop-and-go destination 3 with the openable section 25 aligned with the interaction interface 31, based on a previous manually maneuvered vehicle pull up e.g. with said vehicle—and/or by a user and/or occupant of said vehicle—at the stop-and-go destination 3. Accordingly, a memorized and/or learned behavior of the vehicle 2 and/or a user thereof in terms of pulling up at a specific stop-and-go destination 3—for instance a mailbox to which an occupant of the vehicle 2 has access and/or owns—may form basis for a subsequent ADAS or AD system 21 supported pull up at said specific stop-and-go destination 3. Similarly, additionally or alternatively, the preference data described above may be based on a pre-recorded manual selection of an openable section 25. In a similar manner, additionally or alternatively, the optional opening by the pull up controlling system 1 of the openable section 25 described above, may be based on a pre-recorded manually operated opening of the openable section 25. Further similarly, additionally or alternatively, the optional adjusting of an at least first vehicle setting and/or position of an at least first cockpit function and/or element of the vehicle 2 described above, may be based on a pre-recorded manually operated adjusting of an at least first vehicle setting and/or position of an at least first cockpit function and/or element of the vehicle 2. Thus, behavior memorized and/or learned during a manually operated vehicle pull up at a specific interaction interface 31 of a specific stop-and-go destination 3, e.g. associated with a preferred maneuvering path and/or pull up position as selected by manually operated maneuvering, a preferred openable section 25—and potentially preferred extent of opening thereof—as selected by manual opening of said openable section 25, and/or potentially preferred adjustment of settings and/or positions of cockpit functions and/or cockpit elements as selected by manual adjustment thereof e.g. manually increased interior illumination 271, may hence form basis for a subsequent ADAS or AD system 21 operated pull up at said stop-and-go destination 3.

The pre-recorded manually operated vehicle pull up may be—and/or have been—recorded, learned, memorized and/or stored—e.g. on-board the vehicle 2 and/or in association with a user such as an occupant of the vehicle 2—at any arbitrary prior time point. Moreover, recording of the manually operated vehicle pull up may be—and/or have been—initiated by a user such as an occupant of the vehicle 2, for instance with support from and/or via a user interface, such as the user interface 24 described above.

The phrase "wherein said pull up at said stop-and-go destination is based on a pre-recorded manually operated vehicle pull up" may refer to "wherein said pull up at said stop-and-go destination additionally is based on a pre-recorded manually operated vehicle pull up" and/or "wherein said pull up at said stop-and-go destination is based on a learned, memorized and/or digitally stored manually operated previous vehicle pull up". According to an example, the phrase "based on a vehicle pull up" may refer to "based on a pull up of said vehicle".

As further shown in FIG. 2, the pull up controlling system 1 comprises a position determining unit 101, a destination identifying unit 102, an optional image obtaining unit 103, an optional interface identifying unit 104, an input requesting unit 105, an intention receiving unit 106, a preferences deriving unit 107, a maneuvering unit 108, an optional opening unit 109 and an optional adjusting unit 110, all of which already have been described in greater detail above. Furthermore, the embodiments herein for controlling a vehicle 2 in a planned stop-and-go situation, may be implemented through one or more processors, such as a processor 111, here denoted CPU, together with computer program code for performing the functions and actions of the embodiments herein. Said program code may also be provided as a computer program product, for instance in the form of a data carrier carrying computer program code for performing the embodiments herein when being loaded into the pull up controlling system 1. One such carrier may be in the form of a CD ROM disc and/or a hard drive, it is however feasible with other data carriers. The computer program code may furthermore be provided as pure program code on a server and downloaded to the pull up controlling system 1. The pull up controlling system 1 may further comprise a memory 112 comprising one or more memory units. The memory 112 may be arranged to be used to store e.g. information, and further to store data, configurations, schedulings, and applications, to perform the methods herein when being executed in the pull up controlling system 1. For instance, the computer program code may be implemented in the firmware, stored in FLASH memory 112, of an embedded processor 111, and/or downloaded wirelessly e.g. from an off-board server. Furthermore, the position determining unit 101, the destination identifying unit 102, the optional image obtaining unit 103, the optional interface identifying unit 104, the input requesting unit 105, the intention receiving unit 106, the preferences deriving unit 107, the maneuvering unit 108, the optional opening unit 109, the optional adjusting unit 110, the optional processor 111 and/or the optional memory 112, may at least partly be comprised in one or more nodes 113 e.g. ECUs of the vehicle 2, e.g. in and/or in association with the ADAS or ADS system 21. Those skilled in the art will also appreciate that said units 101-110 described above as well as any other unit, interface, system, controller, module, device, element, feature, or the like described herein may refer to, comprise, include, and/or be implemented in or by a combination of analog and digital circuits, and/or one or more processors configured with software and/or firmware, e.g. stored in a memory such as the memory 112, that when executed by the one or more processors such as the processor 111 perform as described herein. One or more of these processors, as well as the other digital hardware, may be included in a single Application-Specific Integrated Circuitry, ASIC, or several processors and various digital hardware may be distributed among several separate components, whether individually packaged or assembled into a System-on-a-Chip, SoC.

Figure 3:
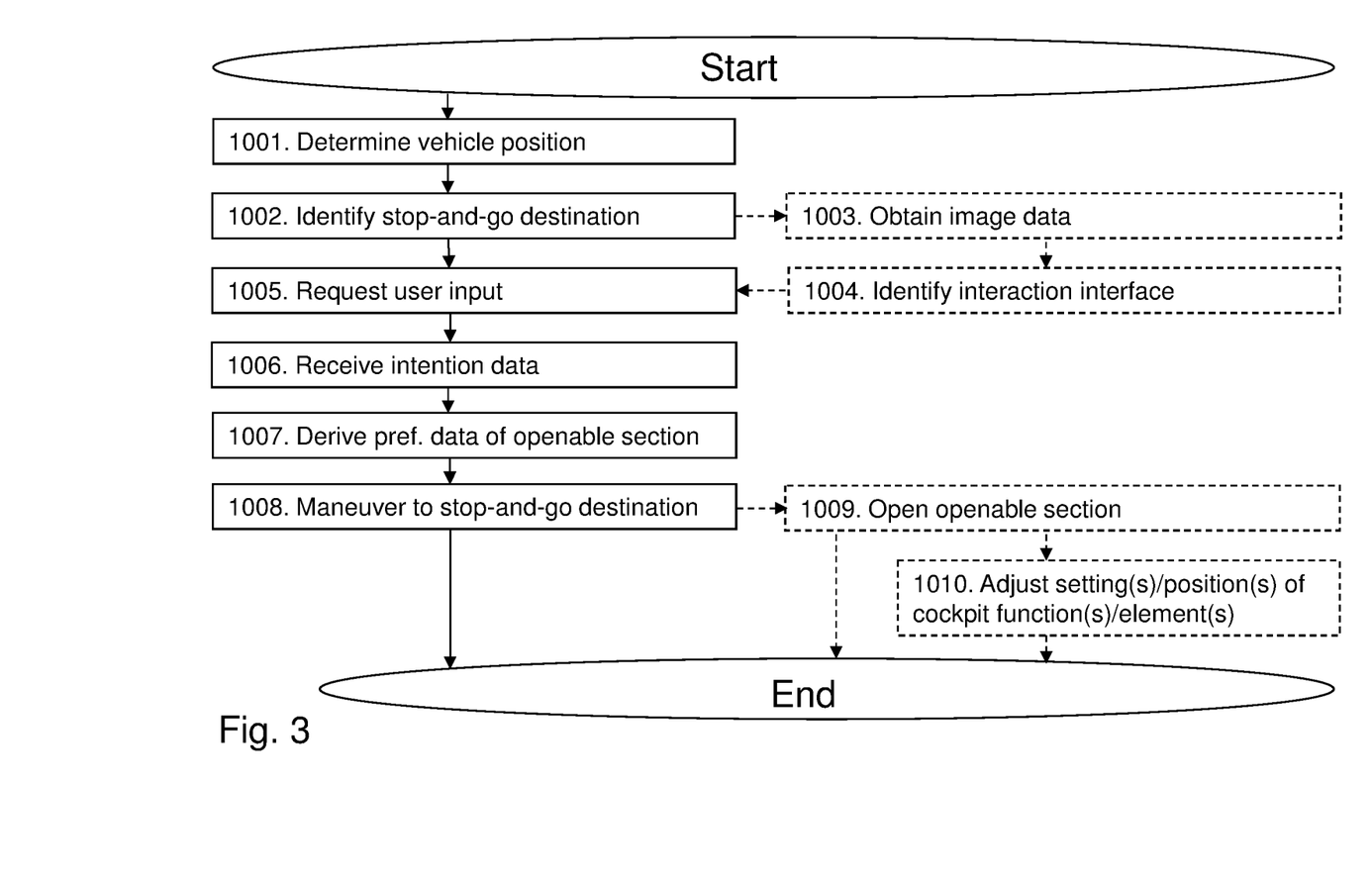
FIG. 3 is a flowchart depicting an exemplifying method performed by a pull up controlling system according to embodiments of the disclosure.

FIG. 3 is a flowchart depicting an exemplifying method performed by a pull up controlling system 1 according to embodiments of the disclosure. Said method is for controlling a vehicle 2 in a planned stop-and-go situation. The exemplifying method, which may be continuously repeated, comprises one or more of the following actions discussed with support from FIGS. 1-2. Moreover, the actions may be taken in any suitable order and/or one or more actions may be performed simultaneously and/or in alternate order where applicable. For instance, optional Action 1003 and/or optional Action 1004 may be performed simultaneously and/or prior to Action 1001 and/or Action 1002.

Action 1001

In Action 1001, the pull up controlling system 1 determines—e.g. with support from the position determining unit 101—with support from a positioning system 22, a position of the vehicle 2.

Action 1002

In Action 1002, the pull up controlling system 1 identifies—e.g. with support from the destination identifying unit 102—with support from a digital map 23, a stop-and-go destination 3 within a predeterminable distance from the vehicle position, wherein the stop-and-go destination 3 comprises an interaction interface 31.

Action 1003

In optional Action 1003, the pull up controlling system 1 may obtain—e.g. with support from the optional image obtaining unit 103—image data 281 with support from one or more image capturing devices 28 adapted to capture surroundings of the vehicle 2.

Action 1004

In optional Action 1004, which may follow upon optional Action 1003, the pull up controlling system 1 may identify—e.g. with support from the optional interface identifying unit 104—the interaction interface 31 based on the image data 281.

Action 1005

In Action 1005, the pull up controlling system 1 provides—e.g. with support from the input requesting unit 105—with support from a user interface 24, a user input request 4 relating to whether to discard or acknowledge the stop-and-go destination 3.

Action 1006

In Action 1006, the pull up controlling system 1 receives—e.g. with support from the intention receiving unit 106—with support from the user interface 24, intention data 5 indicative of confirmation to acknowledge the stop-and-go destination 3.

Action 1007

In Action 1007, the pull up controlling system 1 derives—e.g. with support from the preferences deriving unit 107—preference data indicative of an openable section 25 of the vehicle 2.

Optionally, the openable section 25 of the vehicle 2 may comprise an openable window, for instance positioned near a driver seat or passenger seat of the vehicle 2.

Action 1008

In Action 1008, the pull up controlling system 1 maneuvers—e.g. with support from the maneuvering unit 108— with support from an ADAS or AD system 21 of the vehicle 2, the vehicle 2 to pull up at the stop-and-go destination 3, with the openable section 25 aligned with the interaction interface 31.

Optionally, the pull up at the stop-and-go destination 3 may be based on a pre-recorded manually operated vehicle pull up of the vehicle 2 at the stop-and-go destination 3.

Action 1009

In optional Action 1009, the pull up controlling system 1 may open at least partly—e.g. with support from the optional opening unit 109—with support from an opening/closing control system 26, the openable section 25.

Action 1010

In optional Action 1010, the pull up controlling system 1 may adjust—e.g. with support from the optional adjusting unit 110—at least a first vehicle setting and/or position of at least a first cockpit function and/or element of the vehicle 2 to support vehicle occupant interaction with the interaction interface 31, for instance interior illumination 271 of the vehicle 2 with support from an illumination control system 27

The person skilled in the art realizes that the present disclosure by no means is limited to the preferred embodiments described above. On the contrary, many modifications and variations are possible within the scope of the appended claims. It should furthermore be noted that the drawings not necessarily are to scale and the dimensions of certain features may have been exaggerated for the sake of clarity. Emphasis is instead placed upon illustrating the principle of the embodiments herein. Additionally, in the claims, the word "comprising" does not exclude other elements or steps, and the indefinite article "a" or "an" does not exclude a plurality.

What is claimed is:

1. A method performed by a pull up controlling system of a vehicle for controlling the vehicle in a planned stop-and-go situation, the method comprising:
   determining with support from a positioning system, a position of the vehicle;
   identifying with support from a digital map, a stop-and-go destination within a predeterminable distance from the vehicle position, the stop-and-go destination comprising an interaction interface;
   providing with support from a user interface, a user input request relating to whether to one of discard and acknowledge the stop-and-go destination;
   receiving with support from the user interface, intention data indicative of confirmation to acknowledge the stop-and-go destination;
   deriving preference data indicative of an openable section of the vehicle; and
   maneuvering with support from one of an advanced driver-assistance system, ADAS, and autonomous driving, AD, system of the vehicle, the vehicle to pull up at the stop-and-go destination, with the openable section aligned with the interaction interface.

2. The method according to claim 1, wherein the openable section of the vehicle comprises an openable window positioned adjacent one of a driver seat and a passenger seat of the vehicle.

3. The method according to claim 2, further comprising:
   opening at least partly, with support from an opening/closing control system, the openable section.

4. The method according to claim 2, further comprising:
   adjusting at least one of:
   at least a first vehicle setting; and
   a position of at least one of a first cockpit function and an element of the vehicle,
   to support vehicle occupant interaction with the interaction interface.

5. The method according to claim 2, further comprising:
   obtaining image data with support from at least one image capturing device configured to capture surroundings of the vehicle; and
   identifying the interaction interface based on the image data.

6. The method according to claim 2, wherein the pull up at the stop-and-go destination is based on a pre-recorded manually operated vehicle pull up at the stop-and-go destination.

7. The method according to claim 1, further comprising:
   opening at least partly, with support from an opening/closing control system, the openable section.

8. The method according to claim 7, further comprising:
   adjusting at least one of:
   at least a first vehicle setting; and
   a position of at least one of a first cockpit function and an element of the vehicle,
   to support vehicle occupant interaction with the interaction interface.

9. The method according to claim 1, further comprising:
   adjusting at least one of:
   at least a first vehicle setting; and
   a position of at least one of a first cockpit function and an element of the vehicle,
   to support vehicle occupant interaction with the interaction interface.

10. The method according to claim 1, further comprising:
    obtaining image data with support from at least one image capturing device configured to capture surroundings of the vehicle; and
    identifying the interaction interface based on the image data.

11. The method according to claim 10, wherein the pull up at the stop-and-go destination is based on a pre-recorded manually operated vehicle pull up at the stop-and-go destination.

12. The method according to claim 1, wherein the pull up at the stop-and-go destination is based on a pre-recorded manually operated vehicle pull up at the stop-and-go destination.

13. A pull up controlling system of a vehicle for controlling the vehicle in a planned stop-and-go situation, the pull up controlling system comprising:
    at least one processor configured to:
    determine, with support from a positioning system, a position of the vehicle;
    identify, with support from a digital map, a stop-and-go destination within a predeterminable distance from the vehicle position, the stop-and-go destination comprising an interaction interface;
    provide, with support from a user interface, a user input request relating to whether to discard or acknowledge the stop-and-go destination;
    receive, with support from the user interface, intention data indicative of confirmation to acknowledge the stop-and-go destination;
    derive preference data indicative of an openable section of the vehicle; and
    maneuver, with support from one of an advanced driver assistance system, ADAS, and an autonomous driving, AD, system of the vehicle, the vehicle to pull up at the stop-and-go destination, with the openable section aligned with the interaction interface.

14. The pull up controlling system according to claim 13, wherein the openable section of the vehicle comprises an openable window positioned adjacent one of a driver seat and passenger seat of the vehicle.

15. The pull up controlling system according to claim 13, wherein the at least one processor is further configured to open, at least partly, with support from an opening/closing control system, the openable section.

16. The pull up controlling system according to claim 13, wherein the at least one processor is further configured to adjust at least one of:
   at least a first vehicle setting; and
   a position of at least one of a first cockpit function and an element of the vehicle,
   to support vehicle occupant interaction with the interaction interface.

17. The pull up controlling system according to claim 13, wherein the at least one processor is further configured to:
   obtain image data with support from at least one image capturing device configured to capture surroundings of the vehicle; and
   identify the interaction interface based on the image data.

18. The pull up controlling system according to claim 13, wherein the at least one processor is further configured to maneuver the vehicle to pull up at the stop-and-go destination based on a pre-recorded manually operated vehicle pull up at the stop-and-go destination.

19. A vehicle comprising:
   a pull up control system for controlling the vehicle in a planned stop-and-go situation, the pull up controlling system comprising:
      a position determining unit configured to determine, with support from a positioning system, a position of the vehicle;
      a destination identifying unit configured to identify, with support from a digital map, a stop-and-go destination within a predeterminable distance from the vehicle position, the stop-and-go destination comprising an interaction interface;
      an input requesting unit configured to provide, with support from a user interface, a user input request relating to whether to discard or acknowledge the stop-and-go destination;
      an intention receiving unit configured to receive, with support from the user interface, intention data indicative of confirmation to acknowledge the stop-and-go destination;
      a preferences deriving unit configured to derive preference data indicative of an openable section of the vehicle; and
      a maneuvering unit configured to maneuver, with support from one of an advanced driver assistance system, ADAS, and an autonomous driving, AD, system of the vehicle, the vehicle to pull up at the stop-and-go destination, with the openable section aligned with the interaction interface.

20. A non-transitory computer storage medium storing an executable computer program containing computer program code that, when executed, causes one of a computer and a processor to perform a method for controlling the vehicle in a planned stop-and-go situation, the method comprising:
   determining with support from a positioning system, a position of the vehicle;
   identifying with support from a digital map, a stop-and-go destination within a predeterminable distance from the vehicle position, the stop-and-go destination comprising an interaction interface;
   providing with support from a user interface, a user input request relating to whether to one of discard and acknowledge the stop-and-go destination;
   receiving with support from the user interface, intention data indicative of confirmation to acknowledge the stop-and-go destination;
   deriving preference data indicative of an openable section of the vehicle; and
   maneuvering with support from one of an advanced driver-assistance system, ADAS, and autonomous driving, AD, system of the vehicle, the vehicle to pull up at the stop-and-go destination, with the openable section aligned with the interaction interface.

* * * * *